April 24, 1951 C. A. HALLAM ET AL 2,550,555
APPARATUS FOR EXTRUDING MATERIALS ON CORES UNDER VACUUM
Filed May 11, 1949
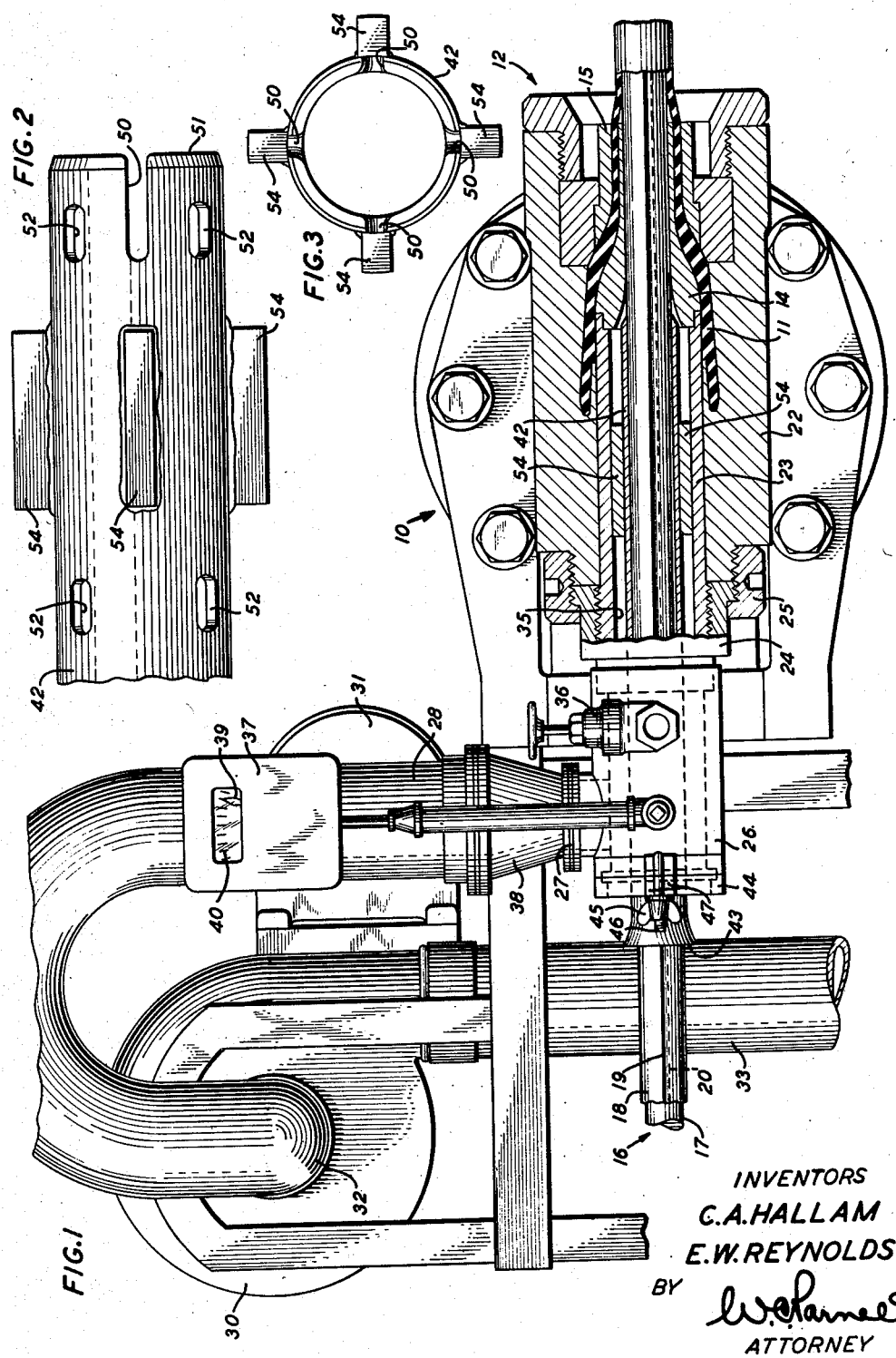
INVENTORS
C.A. HALLAM
E.W. REYNOLDS
BY
ATTORNEY Patented Apr. 24, 1951

2,550,555

UNITED STATES PATENT OFFICE 2,550,555

APPARATUS FOR EXTRUDING MATERIALS ON CORES UNDER VACUUM

Cecil A. Hallam and Ellwood W. Reynolds, Westfield, N. J., assignors to Western Electric Company, Incorporated, New York, N. Y., a corporation of New York Application May 11, 1949, Serial No. 92,608

2 Claims. (Cl. 18—13)

This invention relates to apparatus for extruding materials on cores and more particularly to apparatus for extruding plastic materials on cable cores under vacuum.

In the manufacture of the electrical cables for the communication arts, other materials are now used instead of the lead sheath which has for many years been used as the outer protective casing for such cable. In one instance, the cable core has an overlapped metal sheath and an outer sheath of polyethylene extruded thereon. The polyethylene sheath is in a semi-plastic state as it leaves the extruder head and with normal quantities of air in and about the cable core, the sheath tends to droop away from the core. The present problem is to produce a tight fitting sheath on the core. The creation of a suction or vacuum about the core in advance of the extrusion nozzle eliminates drooping of the semi-plastic sheath. If the polyethylene sheath was extruded directly upon a core composed of only a group of insulated conductors, variations in the vacuum or suction about the core would be of little importance. However, the present core includes an outer metal sheath with overlapping longitudinal edges. Applicants have discovered that in using ordinary suction apparatus, the degree of vacuum actually obtained in the extruder fluctuates, sometimes becoming high enough to open the metal sheath and at other times falling below the minimum value required to prevent drooping of the plastic sheath. One factor contributing to these fluctuations may be the varying quantities of air occluded in different portions of the cable core as well as the varying quantities of air admitted with the core into the apparatus.

An object of the invention is to avoid these difficulties and produce a uniformly tight fitting sheath.

With this and other objects in view, the invention comprises an extruding apparatus wherein the path for the core in advance of the extrusion nozzle is surrounded by a chamber wherein a low but constant vacuum is created to cause the material to be extruded tightly on the core.

More specifically, the apparatus is designed to extrude a plastic material on a cable core having an overlapped metal sheath, the core with the metal sheath extending through a core tube for a given distance within a chamber wherein a low constant vacuum is created by the aid of a suction device communicating with the chamber to exhaust air at a high rate from the chamber. A manually actuable valve communicating with the chamber is provided to bleed air at a controlled rate into the chamber whereby the vacuum in the chamber may be held at a controlled constant vacuum above a predetermined minimum value. The core tube which has apertures disposed at spaced positions therein providing access between the chamber and the core holds the metal sheath against opening, but permits escapement of air through the apertures in the core tube before reaching the extruding area of the apparatus.

Other objects and advantages will be apparent from the following detailed description when considered in conjunction with the accompanying drawing, wherein Fig. 1 is a front elevational view of the extrusion apparatus, portions thereof being shown in section;

Fig. 2 is an enlarged fragmentary detailed view of the inner end of the core tube; and Fig. 3 is an end elevational view taken from the inner or right end of the core tube shown in Fig. 2.

Considering now the drawing, the apparatus includes an extrusion head indicated generally at 10 having the conventional structure to receive a supply of material 11 and force it inwardly about and through the nozzle indicated generally at 12. In the present embodiment of the invention, the material 11 is a plastic material, such as polyethylene, which is preheated sufficiently to cause it to flow under pressure into and through the nozzle 12. The nozzle 12 includes an inner member 14 and an outer member 15 to control the flow of the material 11 about the core indicated generally at 16. The core 16 includes a unit or group of insulated electrical conductors 17 and a metal sheath 18 bent longitudinally about the unit 17 so that its edges 19 and 20 will overlap sufficiently to completely enclose the unit 17.

A main casing 22 of the extrusion head 10 is hollow to receive the inner and outer members 14 and 15 of the nozzle and also receive a tubular housing 23 which supports the inner member 14 of the nozzle. The housing 23 is secured in place by threaded elements 24 and 25 and has an outer portion 26 connected at 27 with an intake line 28 of an exhausting device 30. The device 30 may be of the commercially known suction fan type driven by a motor 31, the intake line 28 being connected at 32 adjacent the center of the device, which is provided with an exhaust line 33.

The interior of the housing 23 constitutes a chamber 35 wherein a low vacuum is to be created by the suction device 30. A manually actuable valve 36 mounted on the outer portion 26 of the housing 23 and communicating with the chamber 35 may be adjusted to bleed air at a desired rate into the chamber to control the vacuum created therein to a predetermined minimum and constant value. A gage 37 supported by a pipe line 38 and connected through this line to the chamber 35 indicates through its pointer 39 and dial 40, the vacuum in the chamber 35.

A core tube 42 has an outwardly flared entrance end 43 to facilitate feeding the core 16 into and through the tube and also through the extrusion nozzle. A mounting plate 44 fixed to the core tube is firmly secured to the housing 23 by wing nuts 45 of bolts 46 pivotally carried by the portion 26 of the housing and receivable between parallel members 47 of the mounting plate. Only one of the wing nuts and bolts is shown in the drawing, but there are at least two of each disposed, for example, upon opposing sides of the core tube. Through this connection, the adjacent end of the housing is closed and sealed airtight about the core tube 42. The core tube 42 extends into the chamber 35 to a position closely adjacent the inner member 14 of the nozzle 12 and has spaced slots 50 formed therein and extending rearwardly from the inner end 51 thereof. Sets of apertures 52 are also formed in the core tube at spaced positions, these apertures together with the slots 50 forming communication between the core 16 and the chamber 35. Equally spaced lugs or spacing elements 54 are formed integral with or secured to the periphery of the core tube to engage the inner wall of the housing 23 and support the core tube concentric with the path of the core 16 and the housing 23 and to align it with the inner member 14 of the nozzle 12.

Considering now the operation of the apparatus, let it be assumed that the core 16 is threaded through the apparatus and that the material 11 is being extruded on to the core during advancement of the core at a given rate of speed longitudinally. The core, with its overlapped metal sheath 18, is guided by the core tube 42 for a given distance in advance of the nozzle 12, that is, the portion 14 thereof. The core tube will therefore assist greatly in maintaining the overlapped edges of the metal sheath in their proper positions but there may be air pockets within the metal sheath which may tend to cause opening of the metal sheath when it is released by the core tube. It is therefore the purpose of the suction device 30 to exhaust air from the chamber 35 surrounding a given length of the core 16 in advance of the nozzle to create a low vacuum in the chamber and through the communication of the core with this suction means at the apertures 52 and slots 50, these pockets of air may be removed. In certain instances, the metal sheath 18 is corrugated laterally before it is formed longitudinally about the core, which increases the possibility for the existence of air pockets between the metal sheath and the unit 17. Furthermore, the occasional existence of irregularities in the cross-sectional dimension of the cable core result in the drawing of quantities of air into the chamber 35. The exhausting device 30 is capable of exhausting air at a far greater rate than it is possible for the air to enter the chamber 35 during the advancement of the cable core. To eliminate the possibility of a pulsating action resulting from the admission of irregular amounts of air into the chamber during the advancement of the core, the valve 36 is opened a given amount to allow air to bleed into the chamber in amounts varying with variations in the suction resulting from varied amounts of air entering the chamber to create a constant minimum low vacuum in the chamber surrounding the core. The minimum low constant vacuum in the chamber will eliminate drooping of the outer or plastic sheath, causing it to form tightly on the core. Furthermore, by maintaining the vacuum at a constant minimum low value disturbance to the metal sheath is eliminated, particularly due to the cooperation of the perforated core tube holding the metal sheath against opening during a time interval when quantities of air in the core may be withdrawn therefrom by suction prior to reaching the inner end of the core tube.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for extruding a sheath of plastic material on a cable core having an overlapped longitudinally wrapped sheath, the apparatus comprising an extrusion nozzle concentric with the path of the core to receive the plastic material under pressure and extrude it about the core, a housing including a chamber surrounding the core in advance of the nozzle, a suction device, connected to the housing and communicating with the chamber, operable to exhaust air at a high rate from the chamber, and a core tube extending into the chamber of the housing to a position adjacent the nozzle to guide the core in its given path while holding the longitudinally wrapped sheath against unwrapping, the core tube having spaced apertures therein intermediate its ends forming communication between the chamber and the core for the escapement of air from the core by the suction device.

2. An apparatus for extruding a sheath of plastic material on a longitudinally advanced cable core having an overlapped longitudinally wrapped sheath, the apparatus comprising an extrusion nozzle concentric with the path of the core to receive the plastic material under pressure and extrude it about the core, a housing including a chamber surrounding the core in advance of the nozzle, a suction device, connected to the housing and in communication with the chamber, operable to create a vacuum of a predetermined minimum value about the core, a core tube extending into the chamber of the housing to a position adjacent the nozzle to guide the core in its given path while holding the longitudinally wrapped sheath against unwrapping, the core tube having spaced apertures therein intermediate its ends and adjacent the exit end thereof forming communication between the chamber and the core for escapement of air from the core by the suction device, and a valve mounted in communication with the chamber to admit air into the chamber to cause the low vacuum to be constant and effect tight extrusion of the plastic material on the core.

CECIL A. HALLAM.
ELLWOOD W. REYNOLDS.

REFERENCES CITED

The following references are of record in the file of this patent:

UNITED STATES PATENTS

| Number | Name | Date |
|---|---|---|
| 1,419,090 | Williams | June 6, 1922 |
| 2,286,922 | Muller | June 16, 1942 |
| 2,401,551 | Cook, Jr. | June 4, 1946 |
| 2,478,018 | Sittner | Aug. 2, 1949 |